INVENTOR.
Herbert P. Ludwig
BY Roberts, Cushman & Grover
ATT'YS.

May 10, 1966  H. P. LUDWIG  3,249,966
APPARATUS FOR MAKING SHOES
Filed June 11, 1964  5 Sheets-Sheet 3
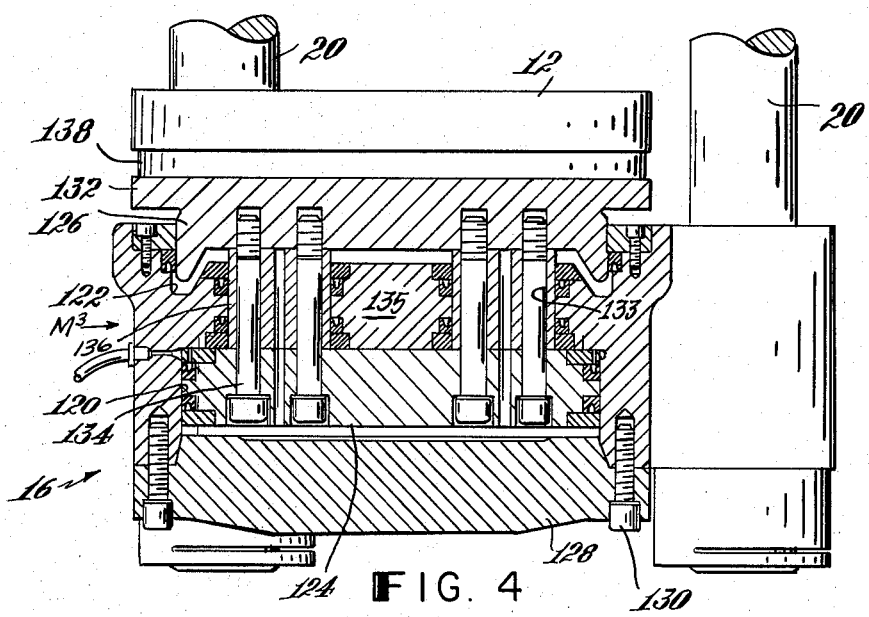
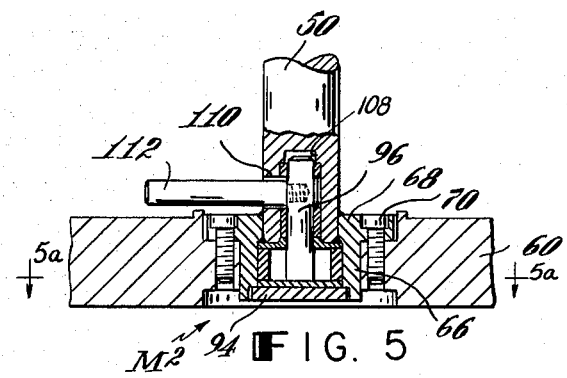
INVENTOR.
Herbert P. Ludwig
BY Roberts, Cushman & Grover
ATT'YS.

May 10, 1966  H. P. LUDWIG  3,249,966
APPARATUS FOR MAKING SHOES
Filed June 11, 1964  5 Sheets-Sheet 4

INVENTOR.
Herbert P. Ludwig
BY Roberts, Cushman & Grover
ATT'YS.

May 10, 1966  H. P. LUDWIG  3,249,966
APPARATUS FOR MAKING SHOES
Filed June 11, 1964  5 Sheets-Sheet 5

Inventor
Herbert P. Ludwig
by Roberts, Cushman & Grover
Attys

United States Patent Office 3,249,966
Patented May 10, 1966

3,249,966
APPARATUS FOR MAKING SHOES
Herbert P. Ludwig, Desmastr. 112, Uesen,
near Bremen, Germany
Filed June 11, 1964, Ser. No. 374,530
Claims priority, application Germany, July 2, 1963,
D 41,878
8 Claims. (Cl. 18—16)

This invention relates to apparatus for use in the making of shoes and, in particular, to a fluid pressure operable press for holding mold parts tightly engaged during shoe making operations involving injection of moldable material into the mold parts and/or vulcanization of moldable material contained within the mold parts. The press may be used for shoe making operations in which the entire shoe or only parts thereof are to be made and the mold parts may include a last to which the moldable material is formed. The purpose of the press, in common with prior presses, is to apply sufficient pressure to the mold parts to prevent leakage and formation of flash at high pressure. The principal objects of this invention are to provide a press of improved construction which provides for an initially, relatively wide separation of the pressure-applying platens so that the mold parts can be easily placed between them for application of pressure and may be readily removed therefrom following completion of the shoe making operation; which provides for rapidly bringing the platens into operative position in spite of their initial wide separation so as to minimize any time delay; which enables employing a relatively long stroke at a low pressure to effect relative movement of the platens from their initial separation to their operative position by means of a relatively small volume of pressure fluid and a minimum displacement thereof; which provides for applying a high closing pressure over a relatively short distance by means of a minimum volume of pressure fluid; which provides, by reason of the small volume of pressure fluid required, an appreciable reduction in the dimensions of the fluid pressure motors and hence the cost of the equipment; and which provides an apparatus which is reliable, easy to operate and maintain.

As herein illustrated, the press is provided with spaced parallel platens supported for movement relative to each other and there is means for effecting movement of one of the platens through a long stroke at a low pressure relative to the other, and means for effecting movement of the other platen through a short stroke at a relatively high pressure. Fluid pressure operable motors comprising cylinder and piston assemblies are provided for effecting movement of the platens relative to each other and these motors are mounted one above the other on a supporting frame with their pistons in axial alignment. The motor effecting movement of the upper platen has a relatively long cylinder and piston rod such that its stroke moves the platen throughout the major portion of the distance between the platens at their initial spacing to bring the platen supported thereby into operative position with respect to a mold assembly resting on the lower platen. The piston rod contains a passage with portions located above and below the piston and a check valve operative to permit flow of pressure fluid from the lower side of the piston to the upper side of the piston during downward movement of the piston in the cylinder. There is means operative when the upper platen reaches its operative position to effect locking thereof against upward displacement by pressure applied by the lower platen. The locking means comprises locking cams supported for movement downwardly with the upper platen relative to fixed portions of the frame and for rotation thereon relative to the fixed portions of the frame for engagement with said fixed portions. Following locking of the upper platen against upward displacement, closing pressure is applied by the lower motor which comprises a cylinder and piston assembly embodying tandemly arranged, relatively large diameter shallow cylinders and correspondingly large diameter pistons, and means securing the pistons to each other so that they move in unison through a very small displacement.

The invention will now be described in greater detail with reference to the accompanying drawings wherein:

FIG. 4 is a vertical section taken on the line 4—4 of

FIG. 5 is an elevation, partly in section, at the lower end of the piston rod supporting the upper platen, showing the motor for rotating the locking cams into locking position;

Figure 1:
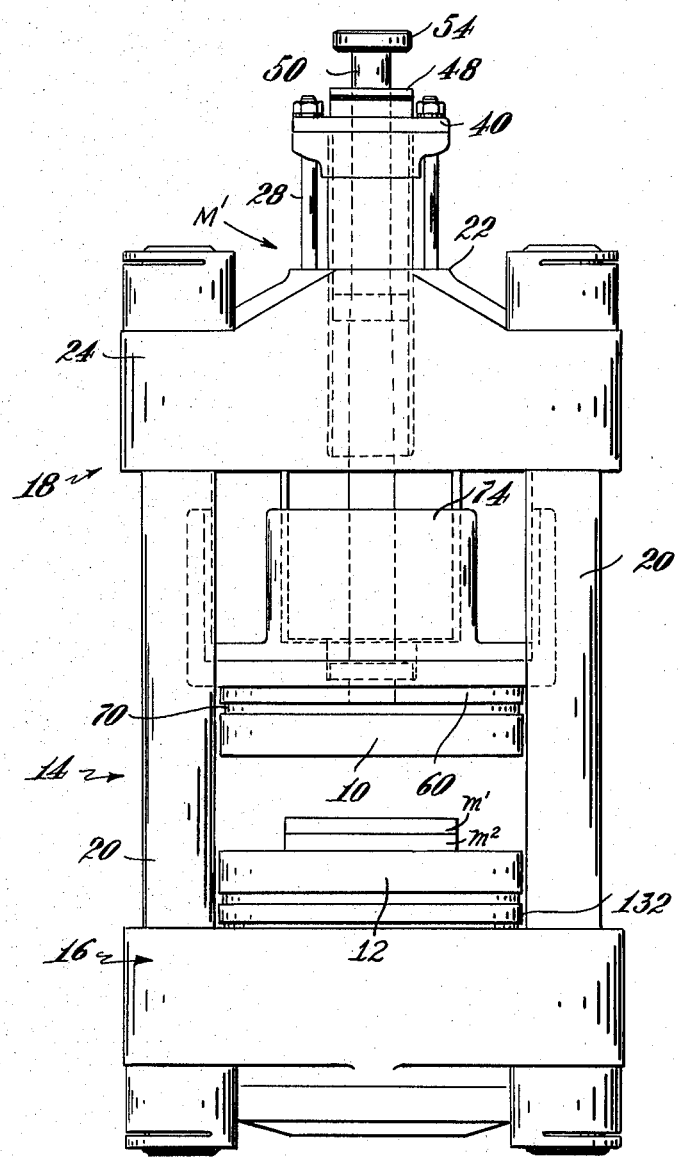
FIG. 1 is an elevation of the apparatus which forms the subject matter of this invention, showing the pressure-applying platens separated.

Referring to FIG. 1, the machine is provided with platens 10 and 12 supported in spaced parallel relation on a frame 14 for movement relative to each other and, in particular, for movement of the upper platen 10 to a position situated at a sufficient distance above the lower platen 12, to enable easily placing mold parts $m1$, $m2$ between the platens preparatory to the shoe operation, throughout substantially the major distance between the patens at a relatively low pressure, to bring the upper platen 10 into engagement with the assembled mold parts resting on the lower platen 12 at a relatively low pressure, and to thereafter move the lower platen 12 a relatively short distance but at a much higher pressure against the underside of the mold assembly, while held against displacement by the upper platen 10, to apply sealing pressure to the mold parts.

The frame 14 has a rigid base block 16 and head block 18 supported in vertically spaced, parallel relation to the base block by posts 20. In accordance with the design of this machine, the base block is of truncated shape in plan, the head block has a circular hub 22 from which extends radial arms 24, there being three of these arms, and the posts 20 connect the ends of the arms 24 to the base block.

Figure 3:
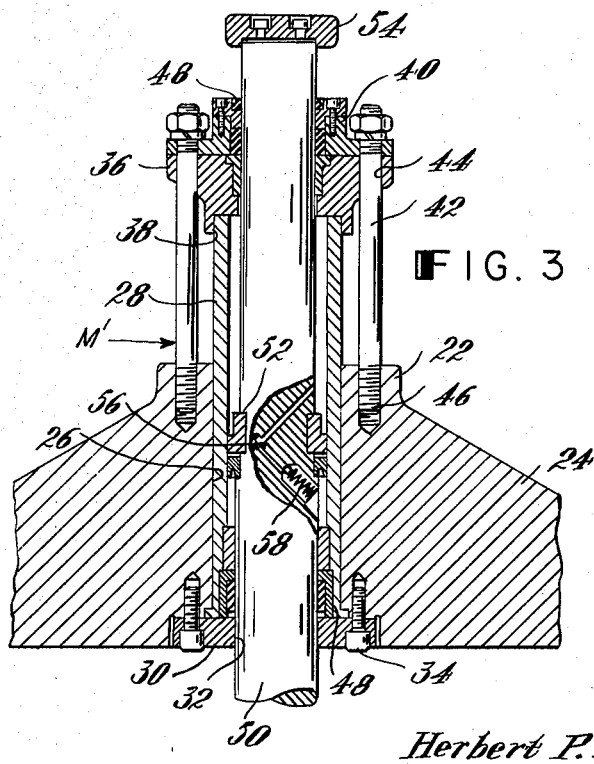
FIG. 3 is a vertical section taken on the line 3—3 of FIG. 2 at the top of the machine.

The head block (FIG. 3) contains centrally of the hub 22 a vertical hole 26 in which there is mounted a hollow cylinder 28. A plate 30, containing a center hole 32, is recessed into the underside of the head block and secured thereto by bolts 34. The lower end of the cylinder 28 rests on the bearing ring 30. A cylinder head 36, containing an annular opening 38, is applied to the upper end of the cylinder 28 and is secured thereto by a bearing cap 40 which, in turn, is secured to the head block 18 by bolts 42, the latter extending through holes 44 in the cylinder head 36 and being screwed into threaded holes 46 in the head block 18. There are suitable glands 48 situated at the opposite ends of the cylinder 28 for slidably receiving a rod 50 for vertical movement in the cylinder. The rod has on it a ring 52 which constitutes a piston dividing the cylinder 28 into lower and upper chambers. The diameter of the piston is smaller above the ring 52 than below it, so that pressure fluid admitted to the upper end of the cylinder applies a greater pressure to effect downward movement than pressure admitted to the lower end of the cylinder applies in raising the piston. A plate 54, secured to the upper end of the rod, by engagement with the gland 48 at the upper side of the bearing cap 40, limits downward movement of the rod. A passage 56 is formed in the rod so as to have a part extending above and below the ring 52. The part extending below the ring 52 has in it a check valve 58 which permits the pressure fluid to flow through it as the rod is moving downwardly but checks its flow as it is moving upwardly. The cylinder, rod and ring constitute a motor M1 for effecting movement of the upper platen and the rod supports, at its lower end (FIG. 6) a pressure plate 60. The pressure plate contains for this purpose in its upper surface an annular opening 62 and concentrically therewith a circular hole 64. A sleeve 66, corresponding in diameter to the hole, is secured to the lower end of the rod and fits into the hole. The sleeve, in turn, has an annular flange 68 which fits into the opening 62 and is secured therein by bolts 70.

The underside of the pressure plate 60 has secured thereto a layer 70 (FIG. 1) of heat-insulating material and the platen 10 is secured to the underside of the insulating layer 70. Thus the platen 10 may be heated or cooled, for example, by a suitable resistance coil or refrigerating coil incorporated therein without transmission of the heat or cold to the pressure-applying plate 60 and to other parts of the machine.

Figure 2:
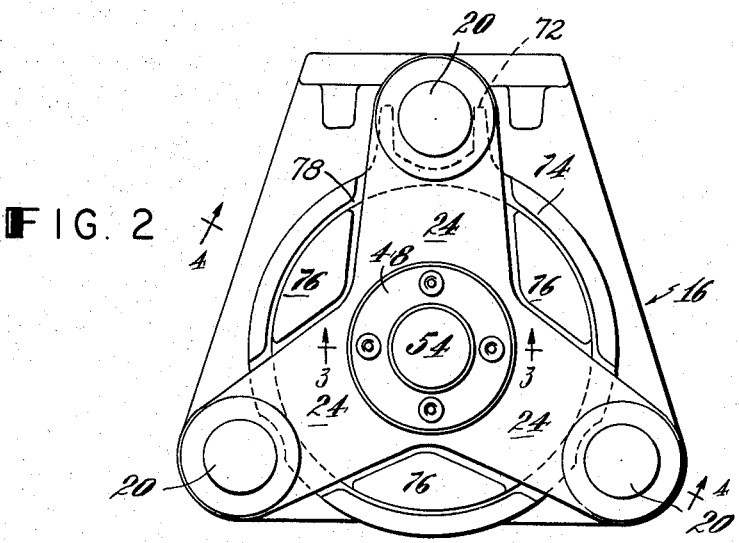
FIG. 2 is a plan view of FIG. 1.

To prevent rotation of the platen 10, the pressure-applying plate 60 (FIG. 7) has at one side an integral fork 72 which embraces the post 20 at the rear side of the machine, as shown in FIG. 2.

Figure 6:
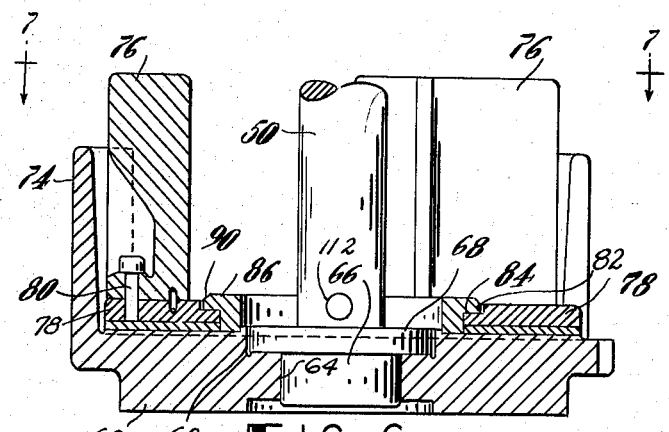
FIG. 6 is an elevation, partly in section, at the lower end of the piston rod supporting the platen, showing the locking cams.
Figure 7:
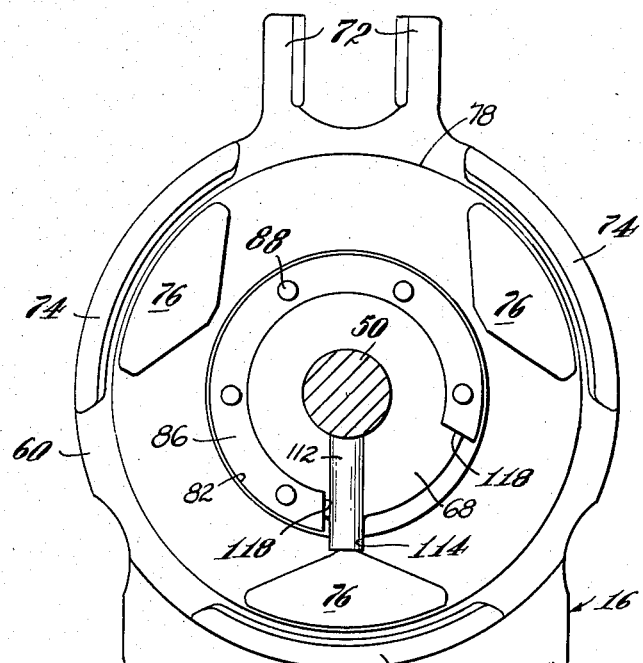
FIG. 7 is a plan taken on the line 7—7 of FIG. 6.

The pressure-applying plate 60 is reinforced and strengthened peripherally by upstanding arcuate walls 74, there being three of these walls spaced at regular intervals circumferentially of the plate as shown in FIGS. 6 and 7. As pointed out above, relatively low pressure is employed to lower the platen 10 hence, when it reaches its operative position, it must be locked to withstand the upward pressure applied by the platen 12. Locking is effected by three cam blocks 76 fastened to an annular plate 78 resting on the upper side of the pressure plate 60 by means of bolts 80. The cam blocks are so positioned that, when the upper platen 10 is in its elevated position, the cam blocks are situated between the arms 24 of the head block, as shown in FIG. 2. The vertical height of the cam blocks is so dimensioned that when the platen 10 is lowered into operative position, the upper ends clear the lower side of the head 18, and, by rotation of the annular plate 78, may be brought into position beneath the arms 24, so as to prevent upward displacement of the platen 10 by pressure applied to the underside of the mold assembly by means of the lower platen, as will appear hereinafter. The cam blocks 76 constitute locking means. The plate 78 contains a center hole 82 and a flange 84 concentric with the center hole 64 in the pressure plate and is rotatably held thereon by a guide ring 86 fastened to the pressure plate by bolts 88. The guide ring 86 has a flange 90 which overlies the flange 84.

Figure 5A:
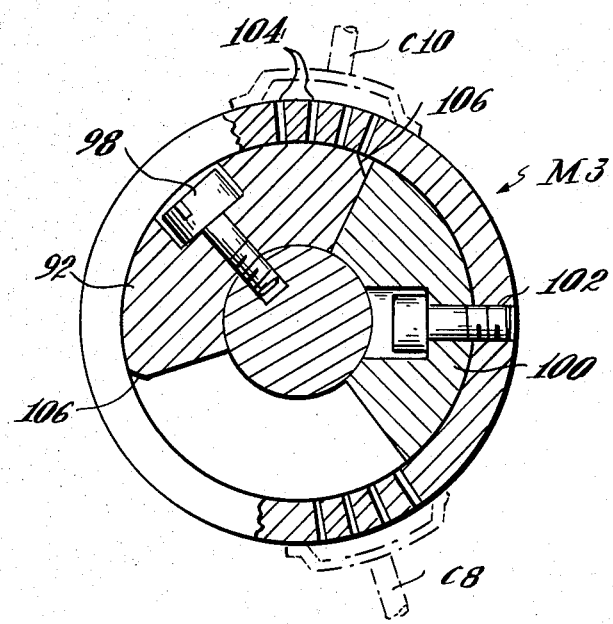
FIG. 5a is a transverse section, to much larger scale, taken on the line 5a—5a of FIG. 5.

Movement of the cam blocks 76 into locking position is effected by means of a fluid pressure motor M2 at the lower end of the rod 50. The motor comprises a cylinder which is constituted by the sleeve 66 heretofore described, which is secured to the lower end of the rod 50, and a rotor 92 (FIG. 5a). The lower end of the sleeve is closed, to provide a fluid chamber, by a plate 94. The rotor is in the form of a segment and has fastened to it, by means of a bolt 98, the lower end of a rod 96. A stator 100, in the form of a segment, is fixed in the cylinder by a bolt 102, so that rotary movement of the segment 92 about the axis of the piston rod 50 is limited by engagement with the fixed segment 100. There are orifices 104 in the cylinder wall adjacent the opposite ends of the fixed segment 100 for supplying fluid under pressure to the cylinder so as to rotate the segment 92 into engagement with one or the other of the ends of the fixed segment 100 and thereby to rotate the rod 96. The opposite ends of the segment 92 are beveled at 106 to permit introduction of fluid pressure between the ends to initiate movement and the several orifices are provided to accelerate the movement once it is started.

The piston rod 50 contains an axial hole 108 at its lower end and the rod 96 projects upwardly from the rotor 92 into this hole. A hole 110 is formed in the piston rod 50 which opens into the axial hole 108, and an arm 112 is inserted through the hole 110 and screwed into the rod 96. The arm 112 projects radially from the piston rod and at its distal end is engaged within a notch 114 formed in the plate 78. An arcuate section of the ring 86 is cut out to accommodate the arm 112 and to provide spaced abutments 118 which limit movement of the arm through about 60° of rotation. Thus rotation of the rotor in the motor M2 will, by rotating the arm 112, effect rotation of the plate 78 to which the cam blocks 76 are fixed.

After the upper platen 10 has been moved down to its operative position and locked in this position by engagement of the cam block 76 with the undersides of the arms 24, the lower platen 12 is raised so as to press the assembled mold parts upwardly against the locked upper platen 10 to seal the mold parts during the shoe making operation.

A fluid motor M3 is provided for effecting upward movement of the platen 12. The motor M3 comprises tandemly arranged cylinders 120 and 122 formed in the lower and upper sides of the base block 16. A piston 124 is mounted in the lower cylinder 120 and a piston 126 in the upper cylinder 122. A cylinder head 128 is fastened to the underside of the base block by bolts 130 to provide a closed chamber within which the piston 124 operates. The piston 126 extends from its cylinder and has integral therewith the lower pressure plate 132. The two pistons 124 and 126 are rigidly secured to each other by bolts 134 inserted through the piston 124, through holes 133 in a diametrical wall 135 between the bottoms of the cylinders, and threaded into the piston 126. Sleeves 136 disposed about the bolts hold the pistons at a predetermined spacing and are slidable into the respective cylinders as the combined pistons are raised and lowered. Suitable packing is provided around the pistons and sleeve. The cylinders 120 and 122 and the pistons therein are of relatively large diameter and hence provide for application of high pressure with a given fluid pressure supplied. The volume of the cylinders is however small so that relatively little pressure fluid is required and the pressure-applying stroke is very short.

An insulating plate 138 is secured to the upper side of the pressure-applying plate 132 and the platen 12 is, in turn, secured to the upper side of the insulating plate. As previously related, the platen may be heated or cooled without transmission of the heat or cold to the operating parts of the machine.

In use at the beginning of any operation, the platens 10 and 12 normally are vertically spaced at their maximum distance, the pistons in the respective motors being retracted. This affords ample space for disposition of the mold parts m1, m2 on the lower platen 12. Pressure is now permitted to enter the upper end of the motor cylinder 28 of the motor M1 which effects movement of the platen 10 downwardly. The piston constituted by the ring 52 on the rod 50 is relatively small hence the pressure fluid applies only a relatively low pressure for moving the piston downwardly. The cylinder and the rod are long hence the platen is moved through the major portion of the distance between the platens 10 and 12 before it is brought to a stop by engagement of the plate 54 at the upper end of the piston rod with the upper side of the packing 48. Downward movement of the platen requires very little energy and can be effected quite rapidly due to the fact that the check valve in the rod permits the fluid at the lower side of the piston ring to flow upwardly therethrough to the upper side hence rapidly filling the cylinder so that very little fluid is required from the pressure source. When the rod is retracted after the cycle is completed, pressure fluid at the upper side of the piston ring is discharged from the cylinder through a suitable valve V3 to a sump S.

When the piston rod 50 reaches its lower operative position, pressure is supplied through the orifices 104 in the cylinder wall of the motor M2 at the lower end of the piston rod so as to rotate the segment 92 about the axis of the piston rod and, by such rotation, to rotate the locking cam ring 78 and hence the locking cams 76 into positions beneath the arms 24. Following locking of the platen 10, pressure is supplied to the cylinders 120, 122 of the motor M3 for effecting upward movement of the platen 12. The pistons 124 and 126, being much larger in diameter than the piston provided by the rod 50 and ring 52, apply a very high pressure over a short stroke to press the platen 12 against the underside of the mold parts, supported at their upper side by the fixed platen 10, to press the mold parts into sealed engagement. The mold parts M1, M2 are held in this fashion until the shoe making operation is completed, whether it be by injection or vulcanization, whereupon pressure is supplied to the motor M3 to lower the platen 12, to the motor M2 to rotate the cam blocks to their inoperative position, and to the motor M1 to raise the platen 10. This enables removal of the mold parts, separation and stripping of the shoe or shoe parts.

Figure 8:
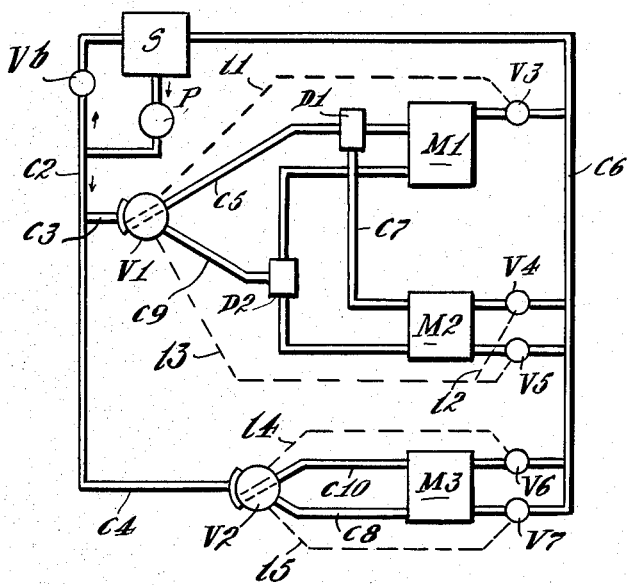
FIG. 8 is a diagram of a fluid pressure system for operating the press.

The hydraulic system for operating the press is illustrated in FIG. 8 diagrammatically in which the motors M1, M2 and M3 are represented as blocks. An oil sump S for holding a sufficient volume of oil to operate the system is connected to the intake side of a pump P. The discharge side of the pump P is connected by a conduit C1 containing a valve Vb which permits return of the hydraulic fluid to the sump S when the pump P is running but the press is idle. The discharge side of the pump P is also connected to a conduit C2 provided with a branch C3 which is connected to a valve V1 and a branch C4 which is connected to a valve V2. The value V2 is manually rotatable to connect the conduit C3 with a conduit C5 which conducts the hydraulic fluid to the upper end of the motor M1. A valve V3 at the upper end of the motor M1 which connects the same with a return conduit C6 is at this time in a closed position. The valve V3 may be mechanically connected to the valve V1 by a linkage represented at L1 so that when the valve V1 is in the open position shown the valve V3 will be in the closed position shown. A delay valve D1 is interposed in the conduit C5 which is designed so that when the piston in the motor M1 has reached the bottom of the cylinder, oil will be supplied through a conductor C7 to one side of the motor M2 so as to rotate the member 96 and hence the arm 112 which, in turn, moves the cams 76 into their locking positions. At this time the valve V4 is closed and the valve V5 is opened, these valves being respectively moved to open and closed positions by linkages L2 and L3 operably connecting the valve V1 with the valves V4 and V5. With the piston 50 lowered and the platen 10 locked in position the operator now rotates the valve V2 to permit hydraulic fluid to flow through the conduit C8 to the lower end of the motor M3 to apply the high pressure to the lower platen 12. At this time the valves V6 and V7 are respectively opened and closed, their operation being effected mechanically through linkages L4 and L5 connecting the valve V2 with the valves V6 and V7. When the high pressure has been maintained for a sufficient length of time to accomplish the desired mode of operation the operator rotates the valve V2 to supply fluid pressure to the conduit C10 and to the top of the motor M3. Rotation of the valve 2 to this position closes the valve V6 and opens the valve V7 so that the fluid pressure is returned to the sump and the platen 12 lowered to release the mold. The valve V1 is now rotated to a position to supply hydraulic fluid through the conductor C9 to the opposite side of the motor M2 so as to rotate the cams to their unlocked position. A delay valve D2 is interposed in the line C9 so that pressure fluid is prevented from entering the lower end of the motor M1 until the member 96 in the motor M2 is rotated in a reverse direction to move the cams 76 to an unlocked position. Rotation of the valve V1 to this position closes valve V5, opens valve V4 and opens valve V3 so that the hydraulic fluid at the opposite side and upper end of the motors M2 and M1 will be returned through the conduit C6 to the sump.

The important advantages of the apparatus described reside in making it possible to have an initial large separation between the platens to facilitate loading and unloading the mold parts, in spite of such separation to bring the platens together rapidly without waste of energy by providing a long low pressure stroke and then to apply a very high pressure through a relatively small distance to seal the mold parts between the platens.

It should be understood that the present disclosure is for the purpose of illustration only and that this invention incluudes all modifications and equivalents falling within the scope of the appended claims.

I claim:

1. In an apparatus for use in making shoes, a base, a crosshead, means supporting the crosshead above the base, first and second fluid motors mounted on the crosshead and base, respectively, opposite each other, said motors containing pistons movable along a common axis, first and second platens supported by the pistons parallel to each other for movement relative to each other from positions remote from each other to positions adjacent each other, a rotatable cam ring supported on said first platen having parts out of alignment with the crosshead, said parts being movable with the first platen to said adjacent position of the platens and rotatable about said axis of the pistons into positions of alignment with the crosshead between said first platen and said crosshead to hold said first platen against displacement by said second platen, and means for effecting rotation of the cam ring about said axis of the pistons comprising a fluid operable motor containing a rotor rotatable about said axis of said pistons, means for supplying pressure fluid to said last-named motor to effect rotation of the rotor, means movable by the rotor operative to rotate the cam ring, and means limiting rotation of the last-named means through an angular distance sufficient to move the cam ring into and out of alignment with the crosshead.

2. In an apparatus for use in making shoes, a base, a crosshead, means supporting the crosshead above the base, first and second fluid motors mounted on the crosshead and base, respectively, opposite each other, said motors containing respectively first and second pistons movable along a common axis, first and second platens supported by the pistons parallel to each other for movement relative to each other from positions remote from each other to positions adjacent each other, locking cams, a rotatable support on said first platen supporting the locking cams, said locking cams having parts situated out of alignment with the crosshead when said first platen is in its remote position, said parts being movable with said first platen to said adjacent position and rotatable at said adjacent position about said axis of the piston to a position between said first platen and the crosshead to prevent displacement of said first platen toward the crosshead, and means for effecting movement of the locking cams about said axis of the pistons comprising a motor cylinder mounted on said first platen, said motor cylinder containing a rotor rotatable about said axis of said pistons, a shaft extending from the rotor through an end of the motor cylinder along the axis of said first piston, said first piston containing an axial bore at its junction with said first platen in which said shaft is situated, an arm secured to said shaft extending radially therefrom through a radial hole in said first piston operative, by engagement with said rotatable support, to effect rotation of said rotatable support to move the cams into said position between said first platen and the crosshead, a stator in the motor cylinder operative to limit rotation of the rotor, and orifices in the wall of the motor cylinder for supplying pressure fluid to the rotor.

3. In an apparatus for making shoes, a support, first and second motors mounted on the support opposite each other, said motors comprising cylinders containing first and second pistons movable along a common axis toward each other, first and second platens supported by the first and second pistons in spaced parallel relation to each other, said first piston being movable through a much longer distance than the second piston, said first motor being operative to move said first platen through the major portion of the distance separating the platens to adjacent positions, said first piston including a piston ring which divides the cylinder into chambers at opposite sides thereof and said first piston containing a passage from one side of the ring to the other, said passage containing a check valve operating to permit flow of fluid from the chamber at said other side of the ring through the passage to the chamber at said one side of the ring during movement of said first piston toward said second piston.

4. In an apparatus for making shoes, spaced parallel first and second platens, means supporting said platens for movement relative to each other to apply pressure to mold parts placed therebetween, said first platen being movable through a major portion of the distance between platens to bring them together into engagement with the mold parts, means for holding said first platen in engagement with the mold parts, said second platen being movable through a relatively short distance to apply pressure to the mold parts held engaged therewith, and a motor for applying pressure to said second platen comprising a cylinder block containing axially aligned shallow, large diameter cylindrical chambers separated from each other by a diametrical wall, pistons situated in the cylinder chambers, the piston in one chamber extending through said end of the cylinder and supporting said second platen, a cylinder head closing the end of the other cylinder chamber, said dividing wall containing a plurality of holes, sleeves extending through the holes into each cylinder chamber into abutting engagement with the pistons in the chambers, said sleeves being slidable in said holes, and bolts extending through the sleeves and securing the pistons in rigid engagement with the opposite ends of the sleeves so that the pistons move in unison.

5. In apparatus for use in making shoes, a base, a crosshead having a hub and three radially extending equally spaced arms, posts supporting the crosshead above the base, said posts being fixed at one end to the base and at their opposite ends to the extremities of said radial arms, a first motor mounted on the hub of the crosshead, a second motor mounted on the base vertically below the first motor, first and second pistons associated respectively with the motors, first and second platens supported in spaced parallel relation by said pistons between the base and crosshead, said first piston being of relatively small diameter and movable through the major portion of the distance between the platens to move the first platen toward the second platen, and said second piston being of relatively large diameter and movable through a short distance toward the first platen, and means for holding the first platen at its extreme forward position comprising a ring rotatably mounted on said first platen concentric with the axis of said first piston, three cam members secured in equally spaced relation to the ring, said ring being rotatable to move the cam members from positions between said radial arm when said first platen is retracted to positions of alignment therewith when said first platen is in its forward position, and a third motor supported at the center of said first platen, a rotor contained by said third motor, and an arm connected to the rotor and movable thereby about the axis of said first piston, said arm having an end interengageable with said ring to effect rotation thereof to move said cam members into and out of alignment with said radial arms.

6. In an apparatus for use in making shoes, a base, a crosshead having a hub containing a central hole and three radially extending equally spaced arms, posts supporting the crosshead above the base, said posts being fixed respectively at their opposite ends to the base and to the ends of the radial arms, a first motor including a first piston mounted on the base, a second motor including a second piston mounted on the crosshead, and first and second platens supported in spaced parallel relation between the base and crosshead by said first and second pistons, the second motor mounted on the crosshead comprising a relatively long, small diameter cylinder supported at one end within said central hole in the crosshead, a bearing ring within the hole against which the cylinder end bears, a bearing cap at the other end of the cylinder, bolts secured at their ends respectively to the hub and to the bearing cap holding the cylinder against said bearing ring, said bearing cap and bearing ring containing aligned holes and said second piston being mounted through said holes with its ends extending respectively from the ends of the cylinder, said second platen being secured to the end of the second piston extending from the side of the crosshead confronting the base, and means secured to the other end of said second piston operable, by engagement with said bearing cap, to limit movement of said second piston in a direction toward the base.

7. In an apparatus for use in making shoes, a base, a crosshead having a hub and three radially extending equally spaced arms, posts supporting the crosshead above the base, said posts being fixed at their opposite ends respectively to the base and the crosshead, a first motor on the hub, said first motor containing a first piston, a second motor on the base, said second motor containing a second piston, first and second platens supported by said first and second pistons in spaced parallel relation for movement toward and away from each other, said first piston having a relatively long stroke and said second piston having a relatively short stroke, and means for fixing the first piston at the forward extent of its stroke, comprising a cam ring having parts movable from positions situated between the radially extending arms in the retracted position of said first platen to positions of alignment with said arms in the extended position of said first platen, and a third motor for effecting movement of said cam ring into and out of operative position, said third motor being supported at the center of said first platen and comprising a motor cylinder recessed into the center of said first platen between the end of said first piston and said first platen so that the first piston constitutes an end of the motor cylinder, a rotor in said motor cylinder, a stator in said motor cylinder limiting rotation of the rotor, a shaft extending from the rotor through the end of the cylinder constituted by the end of said first piston and into an axial passage therein for rotation about an axis coinciding with the axis of said first piston, a slot in the wall of said first piston, and an arm situated in said slot with one end secured to said shaft and its other end extending radially therefrom into engagement with said cam ring.

8. In an apparatus for use in making shoes, a base, a crosshead having a hub and three radially extending equally spaced arms, posts supporting the crosshead above the base, said posts being fixed at their opposite ends respectively to the base and to the ends of the radially extending arms, a first motor mounted on the hub of the crosshead, a first piston in said first motor, and a first platen connected to said first piston, a second motor mounted on the base, a second piston in said second motor, and a second platen connected to said second piston, said first and second platens being supported by said motors in spaced parallel relation for movement toward and away from each other, said second motor comprising shallow, relatively large diameter cylinders recessed bottom to bottom in the base, a diametrical wall between the bottoms of the recesses containing a plurality of circumferentially located holes extending therethrough from one recess to the other, and a composite piston movable in said recesses comprising a first part situated at the upper side of the base with one end in the recess at the upper end and the other end extending therefrom, said second platen being mounted on the extending end of said first part and a second part situated at the lower end of the base within the recess at the lower end; a head secured across the open end of said second recess, and means extending through said circumferential holes securing the first and second parts to each other at a predetermined spacing so that they move in unison within said recesses, sleeves situated in said hole, said sleeves corresponding in length to the predetermined spacing and bearing at their ends on the confronting faces of the pistons and bolts extending through the holes with their heads seated in holes in one piston and their shanks threaded into the other piston.

References Cited by the Examiner

UNITED STATES PATENTS

| | | | |
|---|---|---|---|
| 503,313 | 8/1893 | McCutcheon | 100—219 |
| 997,129 | 7/1911 | Hill | 100—244 XR |
| 1,023,145 | 4/1912 | Fitch | 100—264 XR |
| 1,808,244 | 6/1931 | McCullough | 100—269 |
| 2,273,713 | 2/1942 | Lawyer | 18—30 |
| 2,680,883 | 6/1954 | Ashbaugh | 18—30 XR |
| 2,689,978 | 9/1954 | Roger | 18—30 |
| 2,916,768 | 6/1959 | Quere et al. | 18—30 |
| 2,955,529 | 10/1960 | Marble | 100—244 XR |

WILLIAM A. STEPHENSON, *Primary Examiner.*

BILLY J. WILHITE, J. H. FLINT, *Assistant Examiners.*